United States Patent
Sakai

(10) Patent No.: US 10,324,667 B2
(45) Date of Patent: Jun. 18, 2019

(54) PROGRAM PROCESSING APPARATUS AND METHOD, AND IMAGE FORMING APPARATUS

(71) Applicant: CANON KABUSHIKI KAISHA, Tokyo (JP)

(72) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 15/046,583

(22) Filed: Feb. 18, 2016

(65) Prior Publication Data

US 2016/0266933 A1 Sep. 15, 2016

(30) Foreign Application Priority Data

Mar. 9, 2015 (JP) ................................. 2015-046344

(51) Int. Cl.
| | |
|---|---|
| *G06F 9/46* | (2006.01) |
| *G06F 3/12* | (2006.01) |
| *G06F 9/50* | (2006.01) |
| *G06K 15/02* | (2006.01) |

(52) U.S. Cl.
CPC ............ *G06F 3/122* (2013.01); *G06F 9/5033* (2013.01); *G06K 15/1857* (2013.01)

(58) Field of Classification Search
CPC ...................................................... G06F 3/122
See application file for complete search history.

(56) References Cited

U.S. PATENT DOCUMENTS

| | | | | |
|---|---|---|---|---|
| 4,809,157 A * | 2/1989 | Eilert | .................... | G06F 9/4812 710/269 |
| 6,269,390 B1* | 7/2001 | Boland | ................. | G06F 9/4881 711/120 |
| 7,093,258 B1* | 8/2006 | Miller | .................... | G06F 9/485 718/105 |
| 7,461,376 B2* | 12/2008 | Geye | .................... | G06F 9/5033 718/100 |
| 7,895,415 B2* | 2/2011 | Gonzalez | .............. | G06F 9/3009 712/220 |
| 8,051,418 B1* | 11/2011 | Dice | ..................... | G06F 9/5033 711/147 |
| 8,156,495 B2* | 4/2012 | Chew | .................... | G06F 9/5044 718/102 |

(Continued)

FOREIGN PATENT DOCUMENTS

| | | |
|---|---|---|
| CN | 1685323 A | 10/2005 |
| JP | 2006243864 A | 9/2006 |
| JP | 2012-133682 A | 7/2012 |

OTHER PUBLICATIONS

Chinese Office Action issued in corresponding Chinese Application No. 201610133690.7 dated Feb. 3, 2019.

*Primary Examiner* — Hiren P Patel
(74) *Attorney, Agent, or Firm* — Venable LLP

(57) ABSTRACT

Threads that are generated during specific processing are managed, with an operation core of threads that are generated during activation processing being fixed to a specific core, and an operation core of threads for specific processing that are generated after the activation processing is complete not being set. Also, the setting of the operation core of threads for specific processing that were generated before the timing at which the activation processing is completed is restored to an original setting.

13 Claims, 5 Drawing Sheets

(56) References Cited

U.S. PATENT DOCUMENTS

| | | | | |
|---|---|---|---|---|
| 8,180,973 | B1* | 5/2012 | Armangau | G06F 9/5033 709/225 |
| 8,327,363 | B2* | 12/2012 | Gopalan | G06F 9/4881 718/100 |
| 8,332,852 | B2* | 12/2012 | Gupta | G06F 9/5033 718/100 |
| 8,407,708 | B2* | 3/2013 | Dice | G06F 9/5033 711/147 |
| 8,441,489 | B2* | 5/2013 | Chen | G06F 12/0897 345/505 |
| 8,544,014 | B2* | 9/2013 | Gopalan | G06F 9/5033 718/100 |
| 8,561,073 | B2* | 10/2013 | Gopalan | G06F 9/5033 718/102 |
| 8,739,165 | B2* | 5/2014 | Russell | G06F 9/5027 718/102 |
| 8,873,076 | B2* | 10/2014 | Sato | G06K 15/1807 358/1.13 |
| 8,990,829 | B2* | 3/2015 | Blythe | G06F 11/3409 709/224 |
| 9,152,468 | B2* | 10/2015 | Waddington | G06F 9/5061 |
| 9,448,934 | B2* | 9/2016 | Jacobs | G06F 12/0815 |
| 9,886,318 | B2* | 2/2018 | Duran Gonzalez | G06F 9/3851 |
| 2002/0143953 | A1* | 10/2002 | Aiken, Jr. | H04L 67/1008 709/227 |
| 2002/0143965 | A1* | 10/2002 | Aiken, Jr. | G06F 9/5033 709/229 |
| 2004/0054999 | A1* | 3/2004 | Willen | G06F 9/5044 718/103 |
| 2005/0108714 | A1* | 5/2005 | Geye | G06F 9/5033 718/100 |
| 2005/0108717 | A1* | 5/2005 | Hong | G06F 9/5033 718/102 |
| 2007/0143444 | A1* | 6/2007 | Kamiya | H04L 63/101 709/219 |
| 2007/0245092 | A1* | 10/2007 | Yeh | G06F 12/1458 711/147 |
| 2008/0046895 | A1* | 2/2008 | Dillenberger | G06F 9/505 718/105 |
| 2008/0066045 | A1* | 3/2008 | Athani | G06F 17/5045 714/725 |
| 2008/0195849 | A1* | 8/2008 | Gonzalez | G06F 9/3009 712/223 |
| 2009/0034537 | A1* | 2/2009 | Colrain | H04L 45/121 370/400 |
| 2009/0106755 | A1* | 4/2009 | Chandhoke | G05B 19/052 718/100 |
| 2009/0187909 | A1* | 7/2009 | Russell | G06F 9/5027 718/102 |
| 2009/0251719 | A1* | 10/2009 | Wells | G06K 15/00 358/1.15 |
| 2010/0017804 | A1* | 1/2010 | Gupta | G06F 9/5033 718/102 |
| 2010/0077185 | A1* | 3/2010 | Gopalan | G06F 9/5033 712/220 |
| 2010/0169576 | A1* | 7/2010 | Chen | G06F 12/0897 711/122 |
| 2010/0296575 | A1* | 11/2010 | Lee | H04N 19/119 375/240.02 |
| 2011/0078469 | A1* | 3/2011 | Therien | G06F 1/3203 713/320 |
| 2011/0078700 | A1* | 3/2011 | Blackburn | G06F 9/505 718/105 |
| 2011/0087814 | A1* | 4/2011 | Liu | G06F 13/24 710/260 |
| 2012/0216015 | A1* | 8/2012 | Mitra | G06F 9/445 712/28 |
| 2012/0233609 | A1* | 9/2012 | Blythe | G06F 11/3409 718/1 |
| 2012/0284732 | A1* | 11/2012 | Griglock | G06F 9/5066 718/104 |
| 2013/0155456 | A1* | 6/2013 | Morrison | G06F 3/1296 358/1.15 |
| 2013/0314729 | A1* | 11/2013 | Sato | G06K 15/1807 358/1.13 |
| 2014/0189701 | A1* | 7/2014 | Semin | G06F 9/4812 718/104 |
| 2014/0344550 | A1* | 11/2014 | Kruglick | G06F 9/5044 712/30 |
| 2014/0379998 | A1* | 12/2014 | Hughes | G06F 12/0831 711/146 |
| 2016/0050111 | A1* | 2/2016 | Jang | H04L 41/0896 710/104 |
| 2016/0283278 | A1* | 9/2016 | Duran Gonzalez | G06F 9/3851 |

\* cited by examiner

PROGRAM PROCESSING APPARATUS AND METHOD, AND IMAGE FORMING APPARATUS

BACKGROUND OF THE INVENTION

Field of the Invention

The present invention relates to technology that, when executing a multi-thread program on a multi-core processor, dynamically changes the allocation of operation cores to threads of the program.

Description of the Related Art

In recent years, processors in which a plurality of cores (parts that perform operation processing) are provided have become mainstream. Processors configured in such a manner are called "multi-core processors", and a plurality of threads (execution units of processing) can be simultaneously executed by the respective processor cores. Multi-core processors are not only configured to be mounted in desktop PCs and server apparatuses but also to be mounted in embedded devices such as image forming apparatuses. In the case where a multi-core processor is mounted in an image forming apparatus, a configuration is often used in which a cache is provided for each core and a RAM is shared. In the case of such a configuration, cache misses may frequently occur depending on the running program, due to processing for maintaining cache coherency (i.e., maintaining coherency between the cache for each core and the RAM). Specifically, in the case where there are caches indicating the same data for two or more cores, if one of the cores changes that data, the data cached in the other core becomes invalid and cache misses are likely to occur. This issue is commonly known as false sharing. In the case where false sharing frequently occurs, the overhead for synchronizing the caches becomes extremely large, and therefore performance is significantly reduced compared to performance when operation with a single core processor is performed.

Technology for reducing the frequency of cache misses and executing programs efficiently by fixedly allocating a specific thread to a specific core in order to solve such issues is known (e.g. see Japanese Patent Laid-Open No. 2012-133682, para. 0075-0076, etc.).

However, in the case where a decrease in performance due to false sharing is limited to when specific processing on a specific thread is executed, if the core that operates that thread is always fixed, performance when the specific processing is not executed decreases. For example, in a case such as where performance decreases due to false sharing only while performing processing for activating a specific program in the image forming apparatus, if the operation core for the thread of that specific program remains fixed, there is a concern that performance will deteriorate when the user uses the functions of the image forming apparatus after activation, even if a reduction in performance at activation was prevented. Thus a product with performance that should have otherwise been achieved cannot be provided, and user-friendliness is impaired.

SUMMARY OF THE INVENTION

In the present invention, by employing a configuration that fixes the operation core of a thread while specific processing is executed and restores the settings for the operation core of the relevant thread after the specific processing is complete, operation performance during execution of specific processing is balanced with operation performance after completion of the specific processing.

The present invention has the following configuration.

According to one aspect of the present invention, there is provided a program processing apparatus that executes a plurality of threads using a multi-core processor that includes a plurality of processor cores and a cache for each of the processor cores, comprising: a thread management unit configured to store an identifier of a generated thread; an allocation unit configured to, in a predetermined operation state, fixedly allocate the generated thread of a specific program to a specific processor core; and a unit configured to, upon detecting that the predetermined operation state has been canceled, release the fixed allocation of the thread having the identifier managed by the thread management unit to the specific processor core.

According to another aspect of the present invention, there is provided an image processing apparatus comprising: a program processing device configured to execute a plurality of threads using a multi-core processor that includes a plurality of processor cores and a cache for each of the processor cores, the program processing device including: a thread management unit configured to store an identifier of a generated thread; an allocation unit configured to, in a predetermined operation state, fixedly allocate the generated thread of a specific program to a specific processor core; and a unit configured to, upon detecting that the predetermined operation state has been canceled, release the fixed allocation of the thread having the identifier managed by the thread management unit to the specific processor core; a scanner configured to read an image; a printer configured to print an image; and a control unit configured to provide an interface between the scanner, the printer and an application program that is executed by the program processing device.

According to still another aspect of the present invention, there is provided a program processing apparatus that executes a plurality of threads using a multi-core processor that includes a plurality of processor cores and a cache for each of the processor cores, comprising: a generation unit configured to generate a thread of an application program; and an allocation unit configured to allocate the thread of the application program to one processor core of the plurality of processor cores, wherein the allocation unit, during activation of the application program, fixedly allocates the thread of the application program to a first processor core, and, after activation of the application program is complete, does not fixedly allocate the thread of the application program to the first processor core.

According to the present invention, by employing a configuration that fixes the operation core of a thread while specific processing is executed and restores the settings for the operation core of the relevant thread after the specific processing is complete, operation performance during execution of specific processing can be balanced with operation performance after completion of the specific processing, and thus user-friendliness is improved.

Further features of the present invention will become apparent from the following description of exemplary embodiments with reference to the attached drawings.

DESCRIPTION OF THE EMBODIMENTS

Embodiments according to the present invention will be described in detail below with reference to the drawings. Note that the following embodiments do not limit the present invention according to the scope of the claims, nor are all combinations of features described in the embodiments limited to being essential to resolution means according to the present invention. Also, Java that appears in the embodiments is a registered trademark, but this fact is omitted from the following description as it is expressly stated here.

First Embodiment

Figure 1:
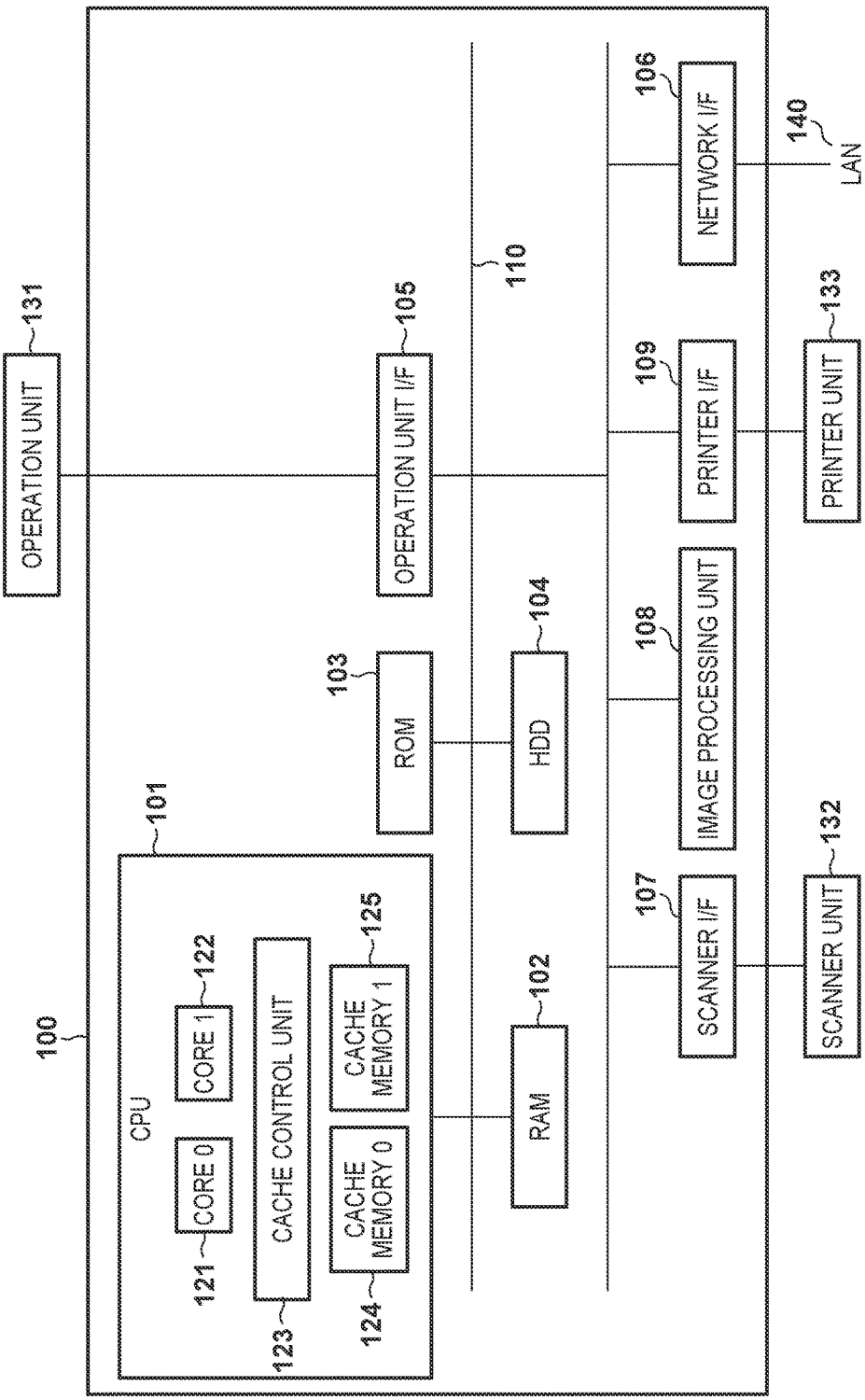
FIG. 1 is a block diagram showing a hardware configuration of an image forming apparatus.

FIG. 1 is a block diagram showing the hardware configuration of the image forming apparatus as an example of a program processing apparatus to which the present invention is applied. The image forming apparatus in FIG. 1 is constituted by an operation unit 131, a scanner unit 132 that is an image input apparatus, a printer unit 133 that is an image output apparatus, and a controller 100 that administers control of the image forming apparatus. The operation unit 131 is made up of a touch panel display and the like and has the function of displaying information to the user and accepting input from the user. The scanner unit 132 performs the operation of reading the image on an original placed thereon to generate image data. The printer unit 133 forms the image data received from the controller 100 into a printed image on a sheet. The controller 100 is electrically connected to the operation unit 131, the scanner unit 132, and the printer unit 133, and is also connected to a LAN 140 via a network I/F 106 and can receive printing jobs from external devices.

A CPU 101 integrally controls the various types of processing performed in the controller 100 based on control programs and the like stored in a ROM 103.

Also, the CPU 101, which is a multi-core processor, has two internal processor cores (a core 0 121 and a core 1 122), cache memories (a cache memory 0 124 and a cache memory 1 125) that correspond to the respective processor cores, and a cache control unit 123 that controls the cache memories.

The core 0 121 and the core 1 122 are parts forming the central core of the processor, and perform the actual operation processing. The cache memories are high-speed memories for caching data, on a RAM 102, that is used by a program. The cache memory 0 124 caches data handled by the core 0 121 and the cache memory 1 125 caches data handled by the core 1 122. Note that usually the difference in speed between the RAM 102 and the cache memories is extremely large, and therefore a secondary cache and a third cache are often mounted in order to alleviate the difference in speed, but for ease of description, an example in which only a primary cache is included will be described.

The cache control unit 123 controls data in the cache memory 0 124 and the cache memory 1 125. Also, the cache control unit 123 performs control to maintain cache coherency (coherency between the RAM 102 and the data in the cache memories). For example, in the case where the same data is cached in the two cache memories, if the core 0 121 changes the data cached to the cache memory 0 124, the content of the data cached to the cache memory 1 125 becomes invalid. For this reason, the cache control unit 123 performs control to invalidate the data cached in the cache memory 1 125 so that the invalid cache is not used. In this case, a cache miss occurs if the core 1 122 attempts to reference the same data and the need arises to read the data from the RAM 102 again, and thus the speed decreases.

The RAM 102 is a system work memory that is used when the CPU 101 is in operation, and is a memory for temporarily storing image data. A boot program of the apparatus is stored in the ROM 103. A HDD 104 is a hard disk drive that can store system software and image data. Also, in the image forming apparatus according to the present embodiment, it is also possible to install a Java application, which is an application program, later and enhance the functions of the image forming apparatus, and the installed Java application is also stored in the HDD 104. An operation unit I/F 105 is an interface unit for connecting a system bus 110 and the operation unit 131. The operation unit I/F 105 receives image data for display on the operation unit 131 from the system bus 110 and outputs the image data to the operation unit 131 as well as outputting information input from the operation unit 131 to the system bus 110. The network I/F 106 is connected to the LAN 140 and the system bus 110 and performs information input and output. A scanner I/F 107 performs correction, processing, and editing on the image data received from the scanner unit 132. Note that the scanner I/F 107 has the function of determining, based on the received image data, whether or not the original is a color original or a black and white original and whether or not the original is a text original or a photo original. An image processing unit 108 performs direction conversion, image compression, decompression processing, and the like on the image data. A printer I/F 109 receives the image data transmitted from the image processing unit 108 and forms the image data into an image while referencing the attribute data attached to the received image data. The image data after image formation is output to the printer unit 133.

Software Configuration

Figure 2:
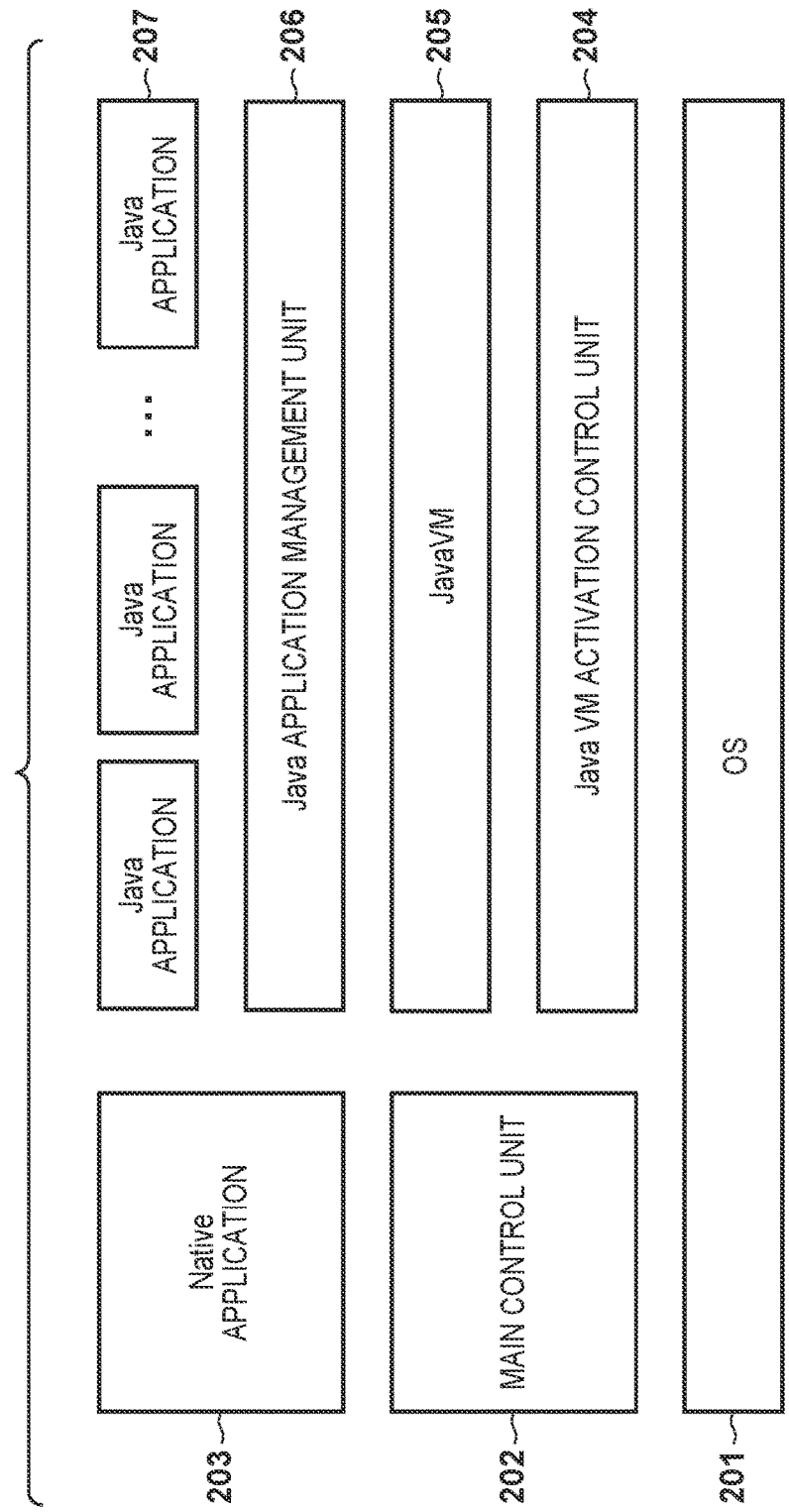
FIG. 2 is a block diagram showing a software configuration of an image forming apparatus.

FIG. 2 is a block diagram showing the software configuration of the image forming apparatus. This software is saved in the HDD 104 and is executed by the CPU 101 after being read out to the RAM 102 by the boot program in the ROM 103.

An OS 201 is a symmetric multi-processing type (SMP)-operating system that generates processing units (threads) for various types of programs. The OS 201 allocates each thread to a core where the thread is executed. Normally, a thread is in a state of being operable in all cores, and the OS 201 determines the operation core of the thread in accordance with a predetermined algorithm. Also, it is possible for a program to set a core in which a thread is operable. For example, it is possible to cause a specific thread to only operate in the core 1 by setting the core 1 as the only core in which the specific thread is operable.

In the image forming apparatus according to the present invention, a main control unit 202 performs activation control of a native application 203 and a Java VM activation control unit 204, and performs management and execution control of various types of jobs for the copier, the scanner, the printer, and the like, which are main functions of the image forming apparatus. Also, the main control unit 202 provides an interface for using the functions provided by the image forming apparatus from the Java applications. The native application 203 is an application that displays a UI for execution of instructions from the copier and scanner, which are main functions of the image forming apparatus, on the operation unit 131, and receives operation instructions from the user and inputs various types of jobs. Also, the native application 203 uses the functions of the OS 201 to generate threads and execute application processing. A core in which a generated thread is operable is not set, and therefore the generated thread is executed in either the core 0 or the core 1 based on the determination made by the OS 201. Accordingly, a plurality of threads can operate simultaneously and processing is performed utilizing performance of the multiple cores.

The Java VM activation control unit 204 activated by the main control unit 202 controls the activation of a Java VM (Java Virtual Machine) 205. Also, the Java VM activation control unit 204 has the function of making a request to the OS 201 to generate a thread when a thread generation request is received from the Java VM 205, and managing the accordingly generated thread.

The Java VM 205 is a virtual machine for executing programs written in Java language (hereinafter "Java program" or "specific program"). Note that the Java VM 205 employs a configuration in which, when the Java VM 205 activates a Java application 207, a specific memory region is frequently accessed by a plurality of generated threads. For this reason, if activation is carried out without fixing the cores of the threads generated when executing a Java program, false sharing frequently occurs, leading to a significant decrease in performance. After activation is complete, the frequency with which threads of the Java applications 207 are executed in parallel is reduced, and therefore the frequency at which false sharing occurs decreases even without fixing threads to a specific core.

A Java application management unit 206 is the first Java program executed when the Java VM 205 is activated and performs management (e.g., installation, uninstallation, activation, stop control) of various types of Java applications 207. Also, the Java application management unit 206 manages the activation state (starting or stopping) of the Java applications 207, and therefore it is possible to understand whether or not the activation processing for all of the Java applications 207 has been completed. Furthermore, the Java application management unit 206 has the function of communicating with a specific processing state management unit 306 and notifying that the activation processing for the Java application group has been completed.

The Java applications 207 are applications for expanding the functions of the image forming apparatus, such as adding recognition functions, operability customization, coordinated operation with external apparatuses, and the like. In the image forming apparatus according to the present embodiment, it is possible to install and simultaneously operate a plurality of Java applications 207.

Note that the present embodiment is configured such that a plurality of Java threads simultaneously execute initialization processing when the MFP (multi-function printer) is activated. Also, memory addresses that are close to each other are often accessed when initialization processing is performed. For this reason, false sharing is likely to occur. Accordingly, the frequency of false sharing occurring can be suppressed and performance can be improved by limiting the cores in which the Java threads operate to one of the cores at activation.

On the other hand, various situations are conceivable for processing after activation depending on the usage needs of the user, and characteristic processing such as that at activation is not performed. For this reason, in order to better receive the benefits of a multi-core CPU, the allocation of threads to cores after activation processing is complete is left to the OS.

Functional Blocks

Figure 3:
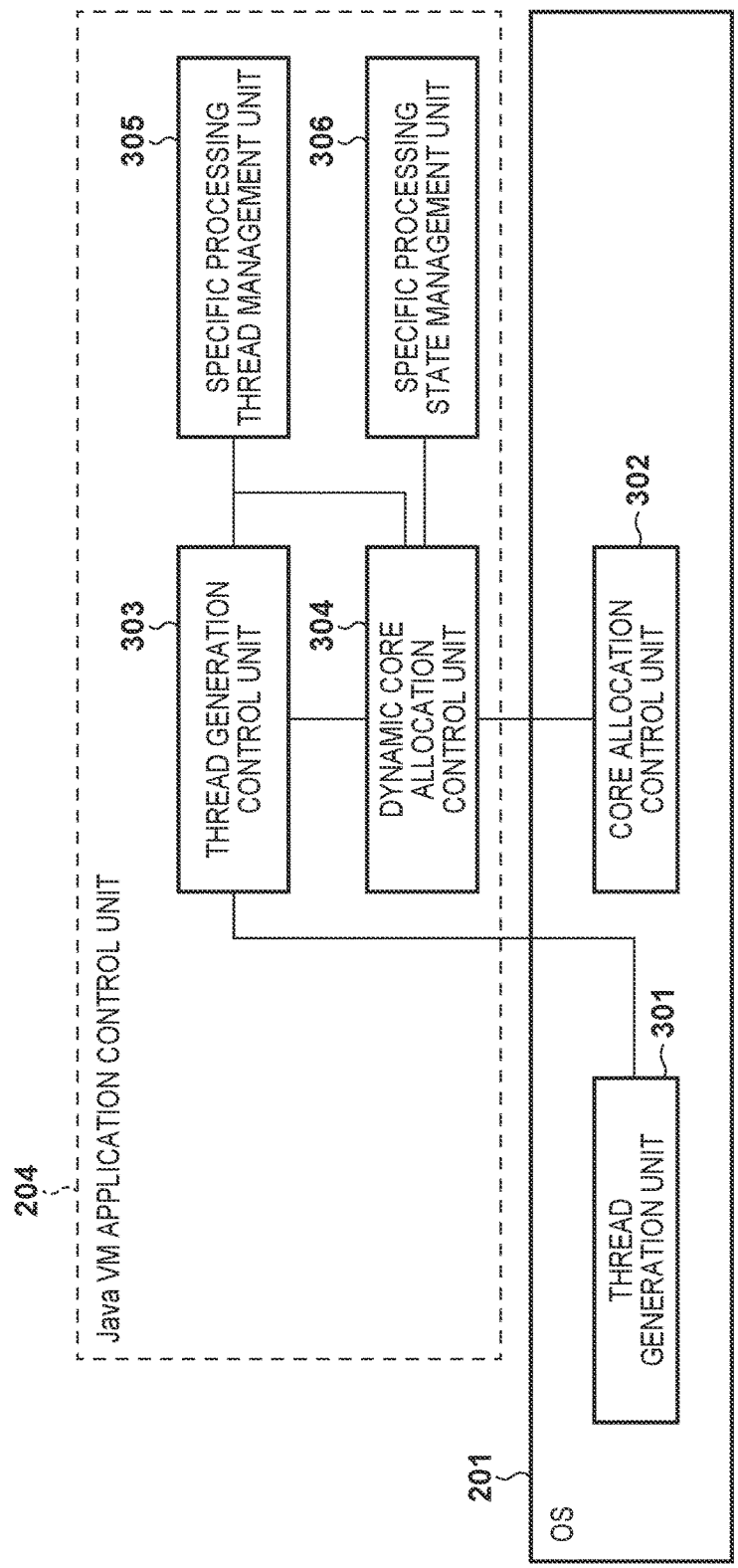
FIG. 3 is a block diagram showing characteristic functions included in the software according to the present invention.

FIG. 3 is a block diagram of characteristic functions provided by the present embodiment in each layer of software of the OS 201 and the Java VM activation control unit 204 shown in FIG. 2.

A thread generation unit 301 is a function included in the OS 201 that generates threads according to requests from a higher level program. At this time, information regarding an entry point function and an argument to the entry point function is passed from the higher level program. An entry point function is a function first executed by a thread when the thread is started, and the entry point function corresponds to the processing content of the thread. Also, when the thread generation unit 301 generates threads, it also generates and manages identifiers (to be referred to as thread IDs) for uniquely identifying the generated threads.

A core allocation control unit 302 is a function included in the OS 201 that sets a core in which a thread can operate according to a request from a higher level program. At this time, the higher level program designates a collection of operation cores for the threads. The OS 201 determines which core a thread is to operate in from the range of designated cores. Accordingly, if only one specific core is designated, control can be performed such that the thread only operates in the designated core. A plurality of cores in which threads are operable can be designated, and therefore, if the processor has three or more cores, control is possible in which processing is only executed in two specific cores.

The thread generation control unit 303 is a function included in the Java VM activation control unit 204 that generates threads in response to requests from the Java VM 205. Entry point functions and the arguments to the entry point functions that are the processing content of the Java program are included in the requests. The thread generation control unit 303, when generating threads, designates an entry point function that performs processing described later with FIG. 4 on the thread generation function 301. Also, a combination of an entry point function and the argument thereto passed from the Java VM 205 is designated as an argument.

A dynamic core allocation control unit 304 controls the operation cores of generated threads, according to the operation state of the programs (e.g. the Java applications 207) operating on the Java VM 205. Specifically, in the case where a program is undergoing activation processing, core allocation is performed such that threads only operate in the core 1, and in the case where a program is not undergoing activation processing, core allocation is performed such that threads can operate in both the core 0 and the core 1. That is to say, in the case where the operation state of a Java application 207 is a predetermined operation state, the dynamic core allocation control unit 304 fixedly allocates the threads of that Java application 207 to a predetermined core. Then, in the case where the operation state of the Java application 207 is no longer in the predetermined operation state, the dynamic core allocation control unit 304 cancels the fixed allocation of the threads of that Java application 207. Accordingly, the threads of this Java application 207 are fluidly allocated to any of a plurality of cores in accordance with a predetermined algorithm of the OS 201 described above. At this time, the operation state of the program is obtained from the specific processing state management unit 306. Also, the allocation of threads that are managed by the specific processing thread management unit 305 to operation cores dynamically changes in response to requests from the specific processing state management unit 306.

The specific processing thread management unit 305 manages threads generated via the thread generation control unit 303. Specifically, the specific processing thread management unit 305 holds a thread management list, and in the list holds thread IDs of existing threads among the threads generated via the thread generation control unit 303. The thread ID is an identifier assigned to identify the thread when the thread generation unit 301 described above has generated a thread.

The specific processing state management unit 306 holds operation state information (activation processing state/activation processing complete) regarding the programs operating on the Java VM 205. The operation state information held by the specific processing state management unit 306 is changed upon reception of a notification from the Java application management unit 206.

Thread Processing Flowchart

Figure 4:
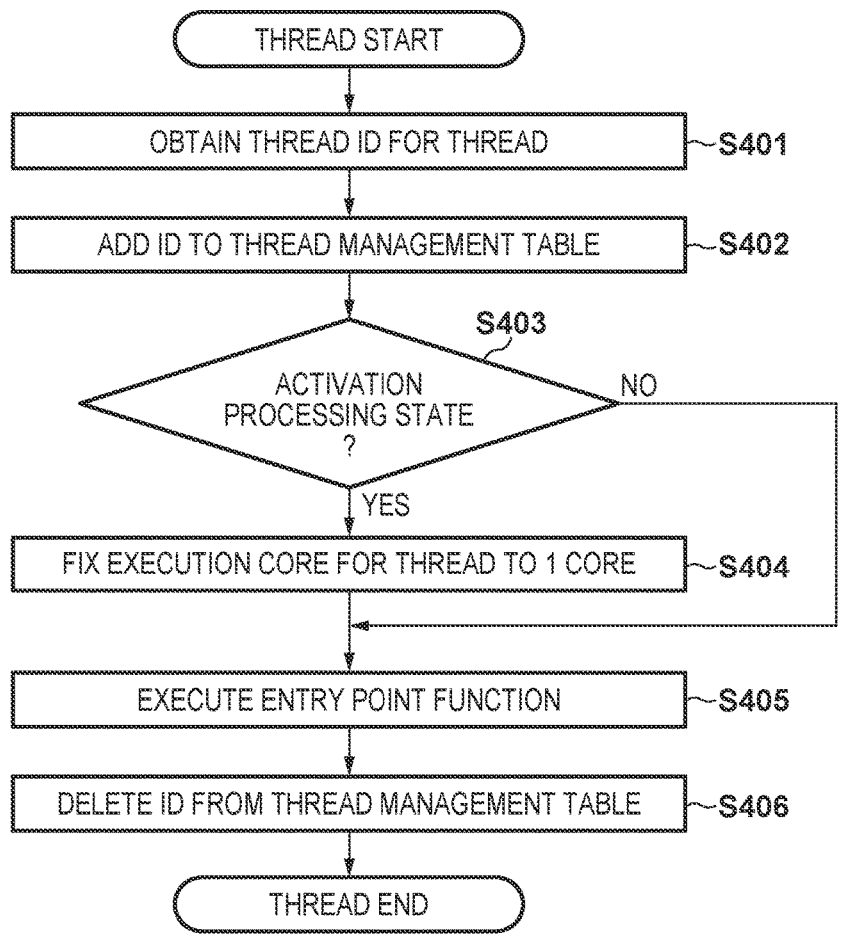
FIG. 4 is a flowchart of processing for a thread generated using a thread generation control unit.

FIG. 4 is a flowchart showing the flow of processing of a thread generated via the thread generation control unit 303, that is to say, an entry point function that the thread generation control unit 303 designates when generating a thread using the thread generation unit 301.

The thread generated by the thread generation control unit 303 first obtains its own thread ID from the OS 201 in step S401.

Next, the procedure moves to step S402, and the thread adds the thread ID obtained in step S401 to the thread management list held by the specific processing thread management unit 305.

Next, the procedure moves to step S403, and the thread obtains operation state information from the specific processing state management unit 306 regarding the program and determines whether or not the operation state is a predetermined operation state, that is to say, an activation processing state. The information regarding the program operation state held by the specific processing state management unit 306 is set by the Java application management unit 206 (described later with FIG. 5). In step S403, if it is determined that the state is the activation processing state, the procedure moves to step S404, and if it is determined that the state is not the activation processing state, the procedure moves to step S405.

In step S404, the thread uses the dynamic core allocation control unit 304 to fix the core 1 as the operation core of the thread. Accordingly, the threads of the Java program will only operate in the core 1, and false sharing is less likely to occur due to the decrease in frequency of access to the same RAM region by the core 0 and the core 1. Naturally, allocating the threads to the core 1 is one example, and it is sufficient to fix threads to any one of the specific processor cores of the multi-core processor. Designating the processor core in which the threads are to be executed is provided as a function of the operating system, and in step S404, the processor core is designated by using this function. In the case where the designated processor core is not the processor core currently executing the thread, the processor core that executes the thread is switched to the designated processor core.

In step S405, the entry point function (actual Java thread processing) designated by the Java VM 205 is executed.

Next, the procedure moves to step S406, and the thread deletes its thread ID obtained in step S401 from the thread management list held by the specific processing thread management unit 305. Thus, this thread ends.

By executing step S401 to step S406, it is possible to fix the execution core of the threads regarding the Java VM to one core only during activation processing, and the activation performance of the program on the Java VM can be improved. Also, it is possible to manage the existing threads regarding the Java VM, and therefore it is possible to dynamically change the allocated operation core of the threads later by executing the steps described below.

Flowchart at Java Application Management Unit Activation

Figure 5:
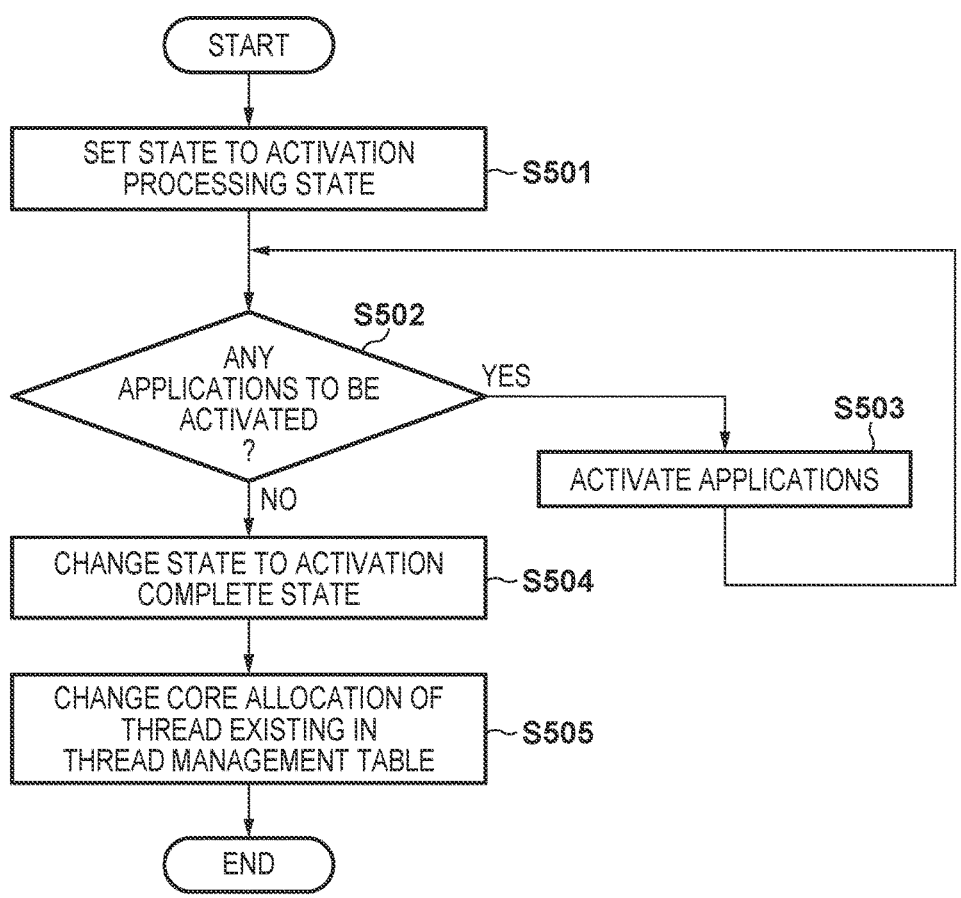
FIG. 5 is a flowchart of activation processing of a Java (registered trademark) application management unit.

FIG. 5 is a flowchart showing the flow of processing at activation of the Java application management unit 206.

The Java application management unit 206 activated by the Java VM 205 sets the state held by the specific processing state management unit 306 of the Java application management unit 206 to the activation processing state in step S501. Accordingly, the operation state will be determined to be the activation processing state in the determination of step S403 in FIG. 4, and therefore the operation core of the threads generated by the thread generation control unit 303 (and threads that have been generated but with respect to which the processing has not reached step S403) will thereafter be fixed to the core 1.

Next, the procedure moves to step S502, and the Java application management unit 206 determines whether or not there are any Java applications that are to be activated from among the group of Java applications. If it is determined that there are Java applications that are to be activated, the procedure moves to step S503.

In step S503, the Java application management unit 206 activates the lead Java application from among the group of Java applications that are to be activated. Note that the threads that are to be generated during activation processing in step S503 are generated via the thread generation control unit 303 and are managed by the specific processing thread management unit 305. Accordingly, the processing for the threads that are to be generated here advances in line with the procedure in FIG. 4. In step S503, the procedure returns to step S502 if the activation processing is complete, and the steps S502 and S503 are repeated until there are no more Java applications that are to be activated. In step S502, if it is determined that there are no applications that are to be activated (if activation of all of the Java applications to be activated has been completed), the procedure moves to step S504.

In step S504, the Java application management unit 206 changes the operation state held by the specific state management unit 306 to the activation processing complete state. A state in which there are no Java applications to be activated detected in step S502, is a state in which the activation processing state has been cancelled, and therefore, in step S504, the predetermined operation state is changed from the activation processing state to the activation processing complete state. Accordingly, the state will be determined to not be the activation processing state in the determination of step S403 in FIG. 4, and therefore, the threads generated henceforth by the thread generation control unit 303 will be operable in either of the core 0 or the core 1.

Next, the procedure moves to step S505, and the dynamic core allocation control unit 304 changes the settings of the processor core in which threads can operate, for each thread corresponding to a thread ID held in the specific processing thread management unit 305, so as to be operable in both the core 0 and the core 1. Naturally, if the number of processor cores is more than two, settings can be changed such that the threads can operate in all of the processor cores. Step S505 is performed using a similar function to that of step S404, for example. The threads whose settings have been cancelled due to the operable core processor settings being changed are executed in a processor core in accordance with new settings under the management of the OS. Accordingly, some threads are executed without the processor core being changed, while other threads are executed after being switched to another processor core.

Note that although details have been omitted from the flowcharts described above for ease of description, the thread management list operations (step S402 and step S406) when threads are generated and ended and the processing in step S505 are exclusive processes. Accordingly, a configuration is employed in which the thread management list is not changed during processing for changing the core allocation.

With the above-described operations, the core in which the Java VM related threads operate can be fixed to the core 1 during the activation processing for the program operating on the Java VM 205, and therefore the frequency of false sharing can be suppressed and performance can be improved. Also, after the activation processing for the program operating on the Java VM 205 has been completed, all of the Java VM related threads can be set to be operable either in the core 0 or the core and therefore the performance after activation can be maintained. Accordingly, the performance at activation can be balanced with the performance at normal processing and user-friendliness can be improved.

Second Embodiment

Next, the second embodiment according to the present invention will be described. In the first embodiment, the thread generation control unit 303 employed a configuration in which a core was set for each thread generated while activation processing was performed. However, in the case where child threads (generated threads) inherit the attributes of the parent thread (generating thread), a configuration may be employed in which the core setting of the parent thread, which is the thread for performing processing for activation a Java VM and which generates threads of Java applications that are to be activated, is changed so as to be allocated to a specific core and the core setting for the threads of Java applications is not changed. In this case, the only thread that is to undergo processing in line with the procedure in FIG. 4 is the parent thread and steps S403 and S404 are not executed for the child threads. However, changing of the allocated core in step S505 in FIG. 5 needs to be performed for each of the threads existing at that point in time.

In the first and second embodiments, the case where the activation processing of the Java program is slow was shown as an example of the specific processing of the specific program. However, the invention according to the present embodiment is not limited to this, and it goes without saying that this invention can be applied to all processing in which false sharing in other processing of other programs leads to performance issues.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-046344, filed Mar. 9, 2015, which is hereby incorporated by reference herein in its entirety.

What is claimed is:

1. A program processing apparatus that executes a plurality of threads, comprising:
    a memory storing a control program; and
    a multi-core processor that includes a plurality of processor cores and respective caches for the plurality of processor cores, wherein when the control program is executed by the multi-core processor it causes the multi-core processor to perform a method comprising:
        storing an identifier of a generated thread;
        setting an operation state to be an activation processing state, when a specific program starts activation processing of an application program, and setting the operation state to be an activation processing complete state, after completion of the activation processing of an application program that is being executed, wherein the application program continues to execute after the activation processing state completes; and
        while the operation state is the activation processing state, fixedly allocating a generated thread of the specific program to a specific processor core, and after the operation state is set to the activation processing complete state, allocating the generated thread of the specific program to a plurality of processor cores determined by an operating system,
        wherein the same data is not cached in the respective caches for the plurality of processor cores by fixedly allocating the generated thread of the specific program to the specific processor core while the operation state is the activation processing state.

2. The program processing apparatus according to claim 1, wherein the specific program is a virtual machine that executes the application program.

3. The program processing apparatus according to claim 2, wherein the virtual machine is a Java virtual machine, and the application program is a Java application.

4. The program processing apparatus according to claim 1, wherein the specific processor core is a specific one of the plurality of processor cores.

5. An image processing apparatus comprising:
a program processing device configured to execute a plurality of threads, the program processing device including:
a memory storing a control program; and
a multi-core processor that includes a plurality of processor cores and respective caches for the plurality of processor cores, wherein when the control program is executed by the multi-core processor it causes the multi-core processor to perform a method comprising:
storing an identifier of a generated thread;
setting an operation state to be an activation processing state, when a specific program starts activation processing of an application program, and setting the operation state to be an activation processing complete state, after completion of the activation processing of an application program that is being executed, wherein the application program continues to execute after the activation processing state completes; and
while the operation state is the activation processing state, fixedly allocating a generated thread of the specific program to a specific processor core, and after the operation state is set to the activation processing complete state, allocating the generated thread of the specific program to a plurality of processor cores determined by an operating system;
wherein the same data is not cached in the respective caches for the plurality of processor cores by fixedly allocating the generated thread of the specific program to the specific processor core while the operation state is the activation processing state;
a printer configured to print an image;
a scanner; and
a control unit configured to provide an interface between the scanner, the printer and an application program that is executed by the program processing device.

6. A program processing method for executing a plurality of threads with a multi-core processor that includes a plurality of processor cores and respective caches for the plurality of processor cores, comprising:
storing an identifier of a generated thread;
setting an operation state to be an activation processing state, when a specific program starts activation processing of an application program, and setting the operation state to be an activation processing complete state, after completion of the activation processing of an application program that is being executed, wherein the application program continues to execute after the activation processing state completes; and
while the operation state is the activation processing state, fixedly allocating a generated thread of the specific program to a specific processor core, and after the operation state is set to the activation processing complete state, allocating the generated thread of the specific program to a plurality of processor cores determined by an operating system,
wherein the same data is not cached in the respective caches for the plurality of processor cores by fixedly allocating the generated thread of the specific program to the specific processor core while the operation state is the activation processing state.

7. The program processing method according to claim 6, wherein the specific program is a virtual machine that executes the application program.

8. The program processing method according to claim 7, wherein the virtual machine is a Java virtual machine, and the application program is a lava application.

9. The program processing method according to claim 6, wherein the specific processor core is a specific one of the plurality of processor cores.

10. A non-transitory computer-readable medium storing a program for causing a computer that executes a plurality of threads using a multi-core processor that includes a plurality of processor cores and a respective caches for the plurality of processor cores to execute a process, the process comprising:
storing an identifier of a generated thread;
setting an operation state to be an activation processing state, when a specific program starts activation processing of an application program, and setting the operation state to be an activation processing complete state, after completion of the activation processing of an application program that is being executed, wherein the application program continues to execute after the activation processing state completes; and
while the operation state is the activation processing state, fixedly allocating a generated thread of the specific program to a specific processor core, and after the operation state is set to the activation processing complete state, allocating the generated thread of the specific program to a plurality of processor cores determined by an operating system,
wherein the same data is not cached in the respective caches for the plurality of processor cores by fixedly allocating the generated thread of the specific program to the specific processor core while the operation state is the activation processing state.

11. The non-transitory computer-readable medium according to claim 10,
wherein the specific program is a virtual machine that executes the application program.

12. The non-transitory computer-readable medium according to claim 10, wherein the specific processor core is a specific one of the plurality of processor cores.

13. The non-transitory computer-readable medium according to claim 11, wherein the virtual machine is a Java virtual machine, and the application program is a Java application.

* * * * *